United States Patent Office 2,735,844
Patented Feb. 21, 1956

2,735,844

CHROMIUM-CONTAINING AZO DYESTUFFS

Reinhard Neier, Basel, and Charles Petitjean and Walter Wehrli, Riehen, Switzerland, assignors to Sandoz A. G., Basel, Switzerland No Drawing. Application January 18, 1954,
Serial No. 404,812

Claims priority, application Switzerland September 4, 1951

6 Claims. (Cl. 260—148)

The present application is a continuation-in-part of the copending application Serial No. 304,012, filed August 12, 1952, and relates to new chromium-containing azo dyestuffs.

A primary object of the invention is the embodiment of chromium-containing azo dyestuffs of especial utility in the dyeing of wool, silk, leather and artificial nitrogen-containing fibers, for instance synthetic polyamide fibers (e. g. nylon, Perlon, etc.), from neutral to weakly acid dyebaths. This object is realized by the dyestuffs according to the invention which correspond in their chromium-free state to the formula

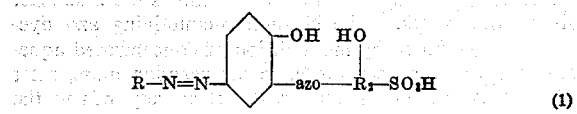
(1)

wherein R stands for the radical of a diazo component of the benzene or naphthalene series,

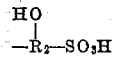

stands for the radical of a coupling component of the hydroxybenzene, hydroxynaphthalene or pyrazolone series, and wherein the OH-group of $R_2$ is located in ortho-position to -azo-.

A preferred series of the chromium-containing azo dyestuffs in accordance with the invention possess the formula

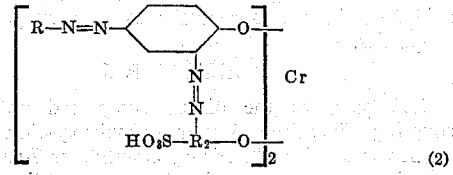
(2)

wherein R has the above-mentioned significance,

stands for the radical of a coupling component of the hydroxybenzene, hydroxynaphthalene or pyrazolone series, and wherein the —O— atom of $R_2$ is located in ortho-position to the respective —N=N— group.

The new dyestuffs are prepared by treating with chromium-yielding agents disazo compounds as obtained inter alia according to the process of the copending application Serial No. 304,012 and which correspond to the Formula 1. These disazo compounds may be obtained, for example, by coupling one mol of the diazo compound of a monoazo dyestuff of the formula

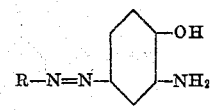
(3)

wherein R has the precedingly-recited significance, with one mole of a corresponding coupling component of the formula

(4)

wherein

has the precedingly-recited significance, or by coupling one mol of the diazo compound of an amine of the benzene or naphthalene series with one mol of a monoazo dyestuff of the formula

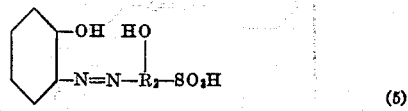
(5)

wherein $R_2$ has the precedingly-recited significance. The monoazo dyestuff of Formula 3 may be prepared by coupling a diazotized amine of the benzene series with a 1-hydroxy-2-N-acylaminobenzene and then converting the acylamino group of the coupling product into the $NH_2$ group by saponification, or by reducing the nitro group of a compound of the formula

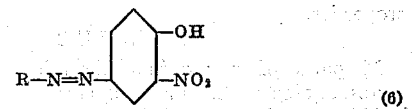
(6)

to $NH_2$. Compound 6—wherein R has the precedingly-recited significance—is obtained by nitration of the corresponding 4-hydroxyazobenzene, obtained by coupling the appropriate amine of the benzene or naphthalene series with hydroxybenzene, or by coupling the appropriate diazotized amine of the benzene or naphthalene series with 1-hydroxy-2-nitrobenzene. Compound 5 may be obtained by coupling the diazo compound of 1-hydroxy-2-aminobenzene with a corresponding azo component which couples in ortho-position to the hydroxy group.

In carrying out the process a preferred method consists in using for the metallization of two molecules of disazo compound less than one atom of chromium, e. g. 0.5 to 0.7 atom, to yield for example the so-called 1:2-complex compounds wherein about one atom of chromium is present for two molecules of disazo compound.

The chroming of the disazo compounds according to the invention advantageously takes place at elevated temperature in aqueous solution or suspension or in organic medium, e. g. in a molten alkali metal salt of a low molecular aliphatic monocarboxylic acid with the aid of a chromium-yielding agent. Such agents comprise, for example, chromic fluoride, chromic sulfate, chromic formate, chromic acetate, potassium chromium (III) sulfate, sodium chromate, potassium chromate, sodium bichromate, potassium bichromate, etc.

The metallization products are advantageously precipitated by the addition of salt (sodium chloride) to the reaction solution, and are then filtered off and finally dried. They are generally dark powders, which dissolve in water with yellow, orange, brown, and olive to gray coloration, and dye wool, silk, nitrogenous synthetic fibers such, for example, as synthetic polyamide fibers, and leather from a neutral to weakly acid bath in similar shades of excellent fastness properties.

The following examples illustrate the invention by reference to exemplary embodiments, but it is not intended to restrict the invention thereto. In the examples, the parts, unless otherwise indicated, are parts by weight, the percentages are percentages by weight and the temperatures are in degrees centigrade. Parts by weight bear the same relation to parts by volume as do grams to cubic centimeters.

EXAMPLE 1

44.8 parts of the disazo compound, obtainable by coupling diazotized 3-amino-4-hydroxy-1,1'-azobenzene with 2-hydroxynaphthalene-4-sulfonic acid, are heated together with 27 parts of ammonium chromium (III) sulfate to 100° in 200 parts of foramide, while stirring, until the starting compound has been completely converted into the chromium complex compound. This is the case after about four hours. The chromium-containing azo dyestuff is precipitated by adding concentrated aqueous sodium chloride solution to the reaction mass, after which the precipitate is filtered off and dried. It corresponds to the formula

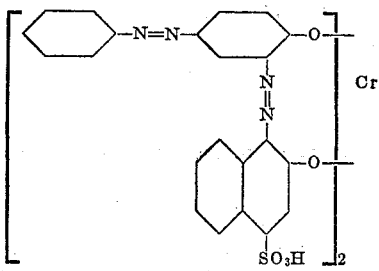

and is a dark powder which dyes wool, silk and synthetic polyamide fibers in neutral gray shades of good fastness properties.

EXAMPLE 2

24 parts of ammonium chromium (III) sulfate—corresponding to 2.6 parts of chromium—are dissolved in 150 parts of water at 50°. 2 parts of sodium hydroxide are added to the solution, and the resultant suspension is stirred until complete dissolution has been achieved. After the addition of 27.6 parts of 1-hydroxybenzene-2-carboxylic acid and 14 parts of sodium hydroxide, the resultant mixture which now has a distinctly alkaline reaction is heated and the resultant solution is brought to a volume of 250 parts by volume. To the resultant solution there is then added a solution of 47.6 parts of the disazo compound, obtainable by coupling diazotized 3-amino-4-hydroxy-2',4'-dimethyl-1,1'-azobenzene with 2-hydroxy-naphthalene-7-sulfonic acid, and 4 parts of sodium hydroxide in 1000 parts of water. The resultant mass is boiled under reflux until the starting material has been completely converted into the chromium complex compound. The latter is then precipitated from the metallization solution by the addition of sodium chloride after which it is filtered off and dried. It corresponds to the formula

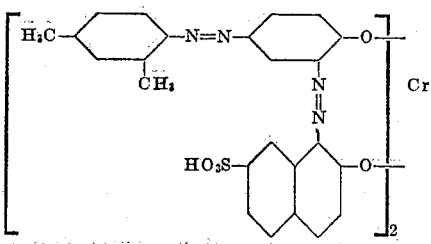

and is a dark powder which dyes wool, silk, leather and synthetic polyamide fibers from a neutral to weakly acid bath in gray-brown shades of very good fastness to light, to washing, to fulling and to potting.

EXAMPLE 3

49.8 parts of the disazo compound, obtainable by coupling diazotized 3-amino-4-hydroxy-1-naphthyl(1')-azobenzene with 2-hydroxynaphthalene-4-sulfonic acid are dissolved together with 4 parts of sodium hydroxide in 1500 parts of water. The resultant solution is combined with 250 parts by volume of a solution, prepared according to Example 2, of the sodium salt of 1-hydroxybenzene-2-carboxylic acid, which contains 2.6 parts of chromium in complex combination, and the resultant mixture is then boiled under reflux until the starting product has been completely converted into the chromium complex compound. The latter is precipitated from the metallization solution by the addition of sodium chloride and is then filtered off and dried. It corresponds to the formula

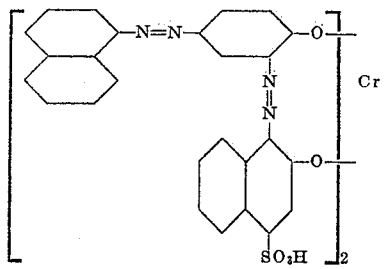

and is a dark powder which dyes wool, silk, leather and synthetic polyamide fibers from a neutral to weakly acid bath in gray shades of very good fastness to light, to washing, to fulling and to potting.

EXAMPLE 4

49.8 parts of the disazo compound, obtainable by coupling diazotized 3-amino-4-hydroxy-1-naphthyl (1')-azobenzene with 1-hydroxynaphthalene-4-sulfonic acid, are heated with 27 parts of ammonium chromium (III) sulfate to 100° in 250 parts of formamide until the starting compound has been completely converted into the chromium complex compound. This is the case after about four hours. The chromium-containing azo dyestuff is precipitated by the addition of concentrated aqueous sodium chloride solution to the reaction mass, after which it is filtered off and dried. It corresponds to the formula

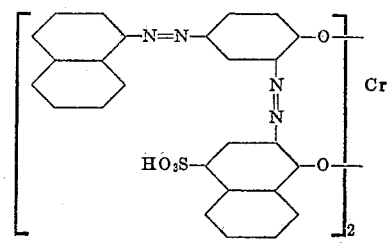

and is a dark powder which dyes wool, silk, leather and synthetic polyamide fibers from a neutral to weakly acid bath in gray-brown shades of very good fastness properties.

EXAMPLE 5

47.8 parts of the disazo compound obtainable by coupling diazotized 3-amino-4-hydroxy-4'-methoxy-1,1'-azobenzene with 2-hydroxynaphthalene-7-sulfonc acid, are dissolved together with 4 parts of sodium hydroxide in 1000 parts of water.

The solution is rendered weakly acid by means of 6 parts of concentrated acetic acid, after which a solution of 11 parts of chromic formate is added thereto. The mixture is then boiled under reflux until the presence of chromium-free dyestuff can no longer be detected in a test specimen. After the addition of sodium chloride to the reaction mass, the chromium complex compound is precipitated, and is then filtered off and dried. It corresponds to the formula.

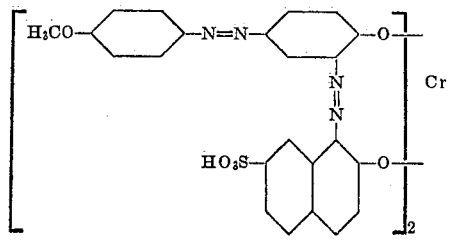

and is a dark powder which dyes wool, silk, leather and synthetic polyamide fibers from a neutral to weakly acid bath in gray-brown shades of very good fastness to light, to washing, to fulling and to potting.

Additional chromium-containing dyestuffs according to the present invention are set forth in the following table; these dyestuffs can be prepared by one of the methods described in Examples 1 to 5. To characterize the azo dyestuffs, column II sets forth the metal-free disazo compounds and column III sets forth the shade of the dyeings of the corresponding chromium complex compounds on wool.

Table

| (I) Example No. | (II) | (III) |
|---|---|---|
| 6 | 3-amino-4-hydroxy-4'-methyl-1,1'-azobenzene → 1-hydroxynaphthalene-4-sulfonic acid. | brown. |
| 7 | 3-amino-4-hydroxy-2',5'-dimethyl-1,1'-azobenzene → 2-hydroxynaphthalene-6-sulfonic acid. | gray-brown. |
| 8 | 3-amino-4-hydroxy-2',3'-dimethyl-1,1'-azobenzene → 2-hydroxynaphthalene-7-sulfonic acid. | Do. |
| 9 | 3-amino-4-hydroxy-2',4',6'-trimethyl-1,1'-azobenzene → 2-hydroxynaphthalene-6-sulfonic acid. | Do. |
| 10 | 3-amino-4-hydroxy-4'-tert.amyl-1,1'-azobenzene → 2-hydroxynaphthalene-6-sulfonic acid. | Do. |
| 11 | 3-amino-4-hydroxy-2'-bromo-4'-nitro-1,1'-azobenzene → 1-phenyl-3-methyl-5-pyrazolone-4'-sulfonic acid. | red-brown. |
| 12 | 3-amino-4-hydroxy-3'-chloro-1,1'-azobenzene → 1-phenyl-3-methyl-5-pyrazolone-4'-sulfonic acid. | Do. |
| 13 | 3-amino-4-hydroxy-2'-methyl-4'-chloro-1,1'-azobenzene → 2-hydroxynaphthalene-4-sulfonic acid. | gray. |
| 14 | 3-amino-4-hydroxy-4'-methoxy-1,1'-azobenzene → 2-hydroxynaphthalene-4-sulfonic acid. | Do. |
| 15 | 3-amino-4-hydroxy-4'-ethoxy-1,1'-azobenzene → 2-hydroxynaphthalene-7-sulfonic acid. | gray-brown. |
| 16 | 3-amino-4-hydroxy-4'-nitro-1,1'-azobenzene → 2-hydroxynaphthalene-6-sulfonic acid. | Do. |
| 17 | 3-amino-4-hydroxy-1-naphthyl(1')-azobenzene → 1-hydroxynaphthalene-4-sulfonic acid. | Do. |
| 18 | 3-amino-4-hydroxy-1-naphthyl(2')-azobenzene → 1-hydroxynaphthalene-4-sulfonic acid. | Do. |
| 19 | 3-amino-4-hydroxy-1-naphthyl(2')-azobenzene → 2-hydroxynaphthalene-4-sulfonic acid. | gray. |
| 20 | 3-amino-4-hydroxy-1-naphthyl(1')-azobenzene → 1-phenyl-3-methyl-5-pyrazolone-4'-sulfonic acid. | orange. |
| 21 | 3-amino-4-hydroxy-1-naphthyl(1')-azobenzene → 1-phenyl-3-methyl-5-pyrazolone-3'-sulfonic acid. | Do. |
| 22 | 3-amino-4-hydroxy-1,1'-azobenzene → 1,3-dihydroxybenzene-4-sulfonic acid. | red-brown. |

EXAMPLE 23

In a dyeing receptacle of two liters capacity, a solution is prepared from 0.5 part of the chromium-containing azo dyestuff according to Example 3, 0.5 part of ammonium sulfate and 1500 parts of water at 40°. 50 parts of well prewetted wool are entered into the dyebath and, while repeatedly moving the material around in the bath, the temperature of the latter is raised to 100° in the course of 30 minutes. The bath is then maintained at this temperature for one hour. At the end of this time, the dyestuff is completely drawn onto the fiber. The dyed material is washed with water and dried.

Having thus disclosed the invention, what is claimed is:

1. A chromium-containing azo dyestuff which corresponds to the formula

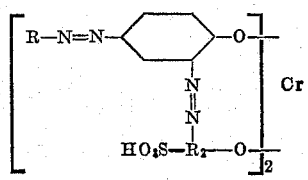

wherein R stands for a member selected from the group consisting of the radicals of diazo components of the benzene and naphthalene series free from sulfonic acid groups, HO₃—S—R₂—O— stands for a member selected from the group consisting of the radicals of coupling components of the hydroxybenzene, hydroxynaphthalene and pyrazolone series, and where in the —O— atom of R₂ is located in ortho-position to the respective —N=N— group.

2. A chromium-containing azo dyestuff corresponding to the formula

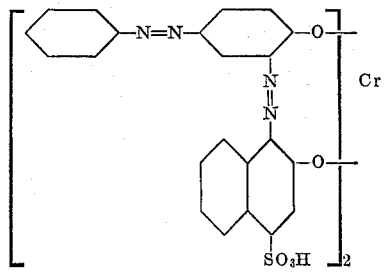

3. A chromium-containing azo dyestuff corresponding to the formula

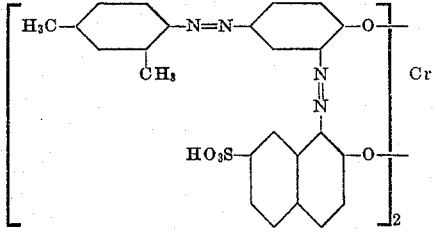

4. A chromium-containing azo dyestuff corresponding to the formula

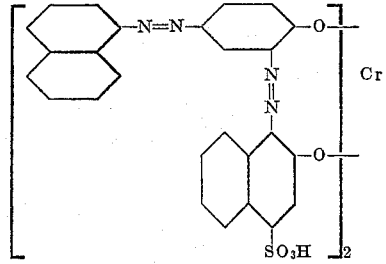

5. A chromium-containing azo dyestuff corresponding to the formula

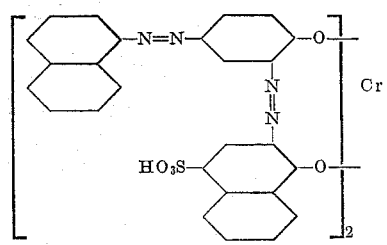

6. A chromium-containing azo dyestuff corresponding to the formula

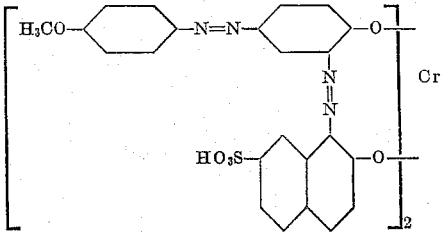

No references cited.